United States Patent
Pandey

(10) Patent No.: US 8,473,898 B2
(45) Date of Patent: Jun. 25, 2013

(54) APPARATUS AND METHOD FOR BUILDING INTEGRATED DISTRIBUTED APPLICATIONS FOR USE WITH A MESH NETWORK

(75) Inventor: Raju Pandey, Davis, CA (US)

(73) Assignee: SynapSense Corporation, Folsom, CA (US)

( * ) Notice: Subject to any disclaimer, the term of this patent is extended or adjusted under 35 U.S.C. 154(b) by 1325 days.

(21) Appl. No.: 12/218,182

(22) Filed: Jul. 8, 2008

(65) Prior Publication Data
US 2010/0011340 A1   Jan. 14, 2010

(51) Int. Cl.
*G06F 8/20* (2006.01)

(52) U.S. Cl.
USPC ........... 717/107; 717/104; 717/105; 717/106; 717/108; 717/109

(58) Field of Classification Search
None
See application file for complete search history.

(56) References Cited

U.S. PATENT DOCUMENTS

| | | | |
|---|---|---|---|
| 4,974,160 A * | 11/1990 | Bone et al. | 715/751 |
| 5,084,813 A * | 1/1992 | Ono | 717/107 |
| 5,295,222 A * | 3/1994 | Wadhwa et al. | 717/104 |
| 5,379,290 A | 1/1995 | Kleijne | |
| 5,515,369 A | 5/1996 | Flammer, III | |
| 5,896,412 A | 4/1999 | Levanon | |
| 6,208,247 B1 | 3/2001 | Agre | |
| 6,404,756 B1 | 6/2002 | Whitehill | |
| 6,442,596 B1 | 8/2002 | Dyer | |
| 6,480,497 B1 | 11/2002 | Flammer, III | |
| 6,590,928 B1 | 7/2003 | Haartsen | |
| 6,735,630 B1 | 5/2004 | Gelvin | |
| 6,807,165 B2 | 10/2004 | Belcea | |
| 6,850,502 B1 | 2/2005 | Kagan | |
| 6,856,591 B1 | 2/2005 | Ma et al. | |
| 6,859,831 B1 | 2/2005 | Gelvin | |
| 7,010,392 B2 | 3/2006 | Bash | |
| 7,020,701 B1 | 3/2006 | Gelvin | |
| 7,031,329 B2 | 4/2006 | Lipsanen | |
| 7,031,870 B2 | 4/2006 | Sharma | |
| 7,086,603 B2 | 8/2006 | Bash | |
| 7,176,808 B1 | 2/2007 | Broad | |

(Continued)

FOREIGN PATENT DOCUMENTS

| | | |
|---|---|---|
| DE | 202006019810 | 5/2007 |
| JP | 2004-336779 | 11/2004 |

(Continued)

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

(Continued)

*Primary Examiner* — Henry Tsai
*Assistant Examiner* — Jing-Yih Shyu
(74) *Attorney, Agent, or Firm* — Inventive Patent Law P.C.; Jim H. Salter

(57) ABSTRACT

Various embodiments provide an apparatus and method for building integrated distributed applications for use with a mesh network. An example embodiment is configured to receive a shared view that is shared among a plurality of components of a network; generate a schema for the plurality of components from the shared view; use the schema to generate code components; and use the shared view and the generated schema to generate integration code for integrating the code components.

39 Claims, 7 Drawing Sheets

U.S. PATENT DOCUMENTS

| | | |
|---|---|---|
| 7,180,915 B2 | 2/2007 | Beyer |
| 7,272,129 B2 | 9/2007 | Calcev |
| 7,287,016 B2 * | 10/2007 | Johnson et al. ............. 706/47 |
| 7,463,644 B2 | 12/2008 | Zhu |
| 7,502,360 B2 | 3/2009 | Liu |
| 7,680,092 B2 | 3/2010 | Van Laningham |
| 7,908,020 B2 * | 3/2011 | Pieronek .................. 700/19 |
| 2002/0073152 A1 | 6/2002 | Andrew |
| 2003/0067892 A1 | 4/2003 | Beyer |
| 2004/0143830 A1 * | 7/2004 | Gupton et al. ............ 717/174 |
| 2005/0024826 A1 | 2/2005 | Bash |
| 2005/0030968 A1 | 2/2005 | Rich et al. |
| 2005/0074025 A1 | 4/2005 | Shao et al. |
| 2005/0129051 A1 | 6/2005 | Zhu |
| 2005/0173549 A1 | 8/2005 | Bash |
| 2005/0201340 A1 | 9/2005 | Wang |
| 2005/0213612 A1 | 9/2005 | Pister |
| 2005/0239411 A1 | 10/2005 | Hazra |
| 2006/0029060 A1 | 2/2006 | Pister |
| 2006/0029061 A1 | 2/2006 | Pister |
| 2006/0034191 A1 | 2/2006 | Sahinoglu |
| 2006/0126501 A1 | 6/2006 | Ramaswamy |
| 2006/0149408 A1 | 7/2006 | Speetzer |
| 2006/0155387 A1 * | 7/2006 | Pieronek .................. 700/1 |
| 2006/0161909 A1 * | 7/2006 | Pandey et al. ............ 717/168 |
| 2006/0198346 A1 | 9/2006 | Liu |
| 2006/0215581 A1 | 9/2006 | Castagnoli |
| 2006/0215583 A1 | 9/2006 | Castagnoli |
| 2006/0225446 A1 | 10/2006 | Bash |
| 2006/0268791 A1 | 11/2006 | Cheng |
| 2006/0269028 A1 | 11/2006 | Bley |
| 2007/0050523 A1 | 3/2007 | Emeott |
| 2007/0116060 A1 | 5/2007 | Qu |
| 2007/0208992 A1 | 9/2007 | Koren |
| 2007/0211686 A1 | 9/2007 | Belcea |
| 2007/0258508 A1 | 11/2007 | Werb |
| 2008/0004904 A1 * | 1/2008 | Tran .................... 705/2 |
| 2008/0008138 A1 | 1/2008 | Pun |
| 2008/0019265 A1 | 1/2008 | Alluisi et al. |
| 2008/0019302 A1 | 1/2008 | Nagarajan et al. |
| 2008/0043707 A1 | 2/2008 | Ren |
| 2008/0095222 A1 | 4/2008 | Van Laningham |
| 2008/0151801 A1 | 6/2008 | Mizuta |
| 2008/0269932 A1 | 10/2008 | Chardon |
| 2008/0298450 A1 | 12/2008 | Zhang |
| 2009/0109992 A1 | 4/2009 | Lurie et al. |

FOREIGN PATENT DOCUMENTS

| | | |
|---|---|---|
| JP | 2006-311549 | 11/2006 |
| WO | WO2005083953 | 9/2005 |
| WO | WO2007015962 | 6/2007 |
| WO | WO2008021278 | 7/2008 |

OTHER PUBLICATIONS

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

* cited by examiner

APPARATUS AND METHOD FOR BUILDING INTEGRATED DISTRIBUTED APPLICATIONS FOR USE WITH A MESH NETWORK

RELATED APPLICATIONS

This patent application is related to co-pending patent application Ser. No. 12/001,884, filed on Dec. 12, 2007, titled, "APPARATUS AND METHOD FOR ADAPTIVE DATA PACKET SCHEDULING IN MESH NETWORKS, and assigned to the same assignee as the present application.

This patent application is related to co-pending patent application Ser. No. 12/001,917, filed on Dec. 12, 2007, titled, "APPARATUS AND METHOD FOR ADAPTING TO FAILURES IN GATEWAY DEVICES IN MESH NETWORKS, and assigned to the same assignee as the present application.

TECHNICAL FIELD

The disclosed subject matter relates to the field of software and system generation and network communications, and more particularly to building integrated distributed applications for use with a mesh network.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g. radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (the nodes are "plugged in") or from batteries in each node. As the size, power, and cost of the computation and communication requirements of these devices has decreased over time, battery-powered wireless nodes have gotten smaller; yet, the computing demands on the wireless nodes have increased.

Wireless sensor networks are finding applications in a wide range of areas, including disaster recovery, homeland security, infrastructure monitoring, habitat monitoring, and pervasive computing environments. Wireless sensor network technology can be used for deploying sensors as nodes in a variety of different environments for monitoring diverse parameters such as, for example, temperature, pressure, particle counts, and humidity. These types of networks can be denoted wireless sensor networks (WSN). A wireless sensor network is typically comprised of a collection of devices embedded in a physical environment which gather information, perform local computations, and communicate with other devices and hosts through a wireless network.

Wireless sensor networks pose unique challenges for software developers compared to other forms of software construction; because, the devices that comprise wireless sensor networks have limited amounts of memory, processing capability, and battery power. As a result, wireless sensor network research has created designs for a wide variety of highly-efficient hardware platforms specialized to perform specific tasks. The wide variety of such platforms creates a considerable burden for the programmer, who needs to be aware of the idiosyncrasies of each specific platform.

Over time, as the installed base of sensor networks grows, the need to support applications across heterogeneous devices and platforms will continue to grow. The capabilities of the system software used during development of applications for wireless sensor networks can greatly affect the complexity of implementing wireless sensor networks. However, existing techniques for developing such applications have so far only focused on developing applications for a single platform.

U.S. Patent Application Publication No. 2006/0161909 describes a method and a system for synthesizing a scalable and incrementally updatable system software infrastructure for sensor networks. During operation, the system receives a specification for an application and a specification for target devices. The system analyzes these specifications in order to identify a set of software components required to support the application, and then proceeds to synthesize a customizable software stack that accommodates the identified set of software components on a specified target device. This process generates a minimal, resource-efficient software stack for a specific application on the specified target device.

Building distributed WSN applications has been extremely difficult as it requires mechanisms for addressing extreme heterogeneity among embedded devices and enterprise systems, for developing software stacks that fit on highly resource constrained embedded devices, and for integrating different software components that use different forms of networking technology, (such as 802.15.4, TCP/IP, local area networking and Web-based systems) to communicate with each other.

Currently, most application developers use an ad hoc approach to building such applications. These conventional approaches typically involve manually developing and assembling the following components: (i) low level implementation of applications on embedded devices, (ii) data collection software that acts as bridge software between the sensor network and the enterprise world, (iii) utility software (such as database storage, visualization and alert system, etc), (iii) bridge software for transcoding between different networking models and protocols, and (iv) serialization/de-serialization software at both the embedded system end and the analysis processing and enterprise application end. Such a build-and-assemble approach has several weaknesses: 1) Data inconsistency: Different software components may use different data models, thereby introducing inconsistency across the entire system. This will lead to incorrect data collection and analysis; 2) Code duplication: The manual effort duplicates much of the data processing and data communication code. This is time consuming and error prone; 3) Limited remote control support: The manual approach limits the kinds of remote control that can be supported; 4) Limited extensibility: The manual effort limits the number of service components that can be easily added to the system; 5) Manual development: The approach requires manual development of a large portion of the application, which entails significant effort and cost, and is error prone; and 6) Device-specific development: The development approach tends to be specific to a device. This requires significant re-development effort if heterogeneous sets of devices and gateways are used.

Thus, an apparatus and method for building integrated distributed applications for use with a mesh network are needed.

DETAILED DESCRIPTION

Figure 1:
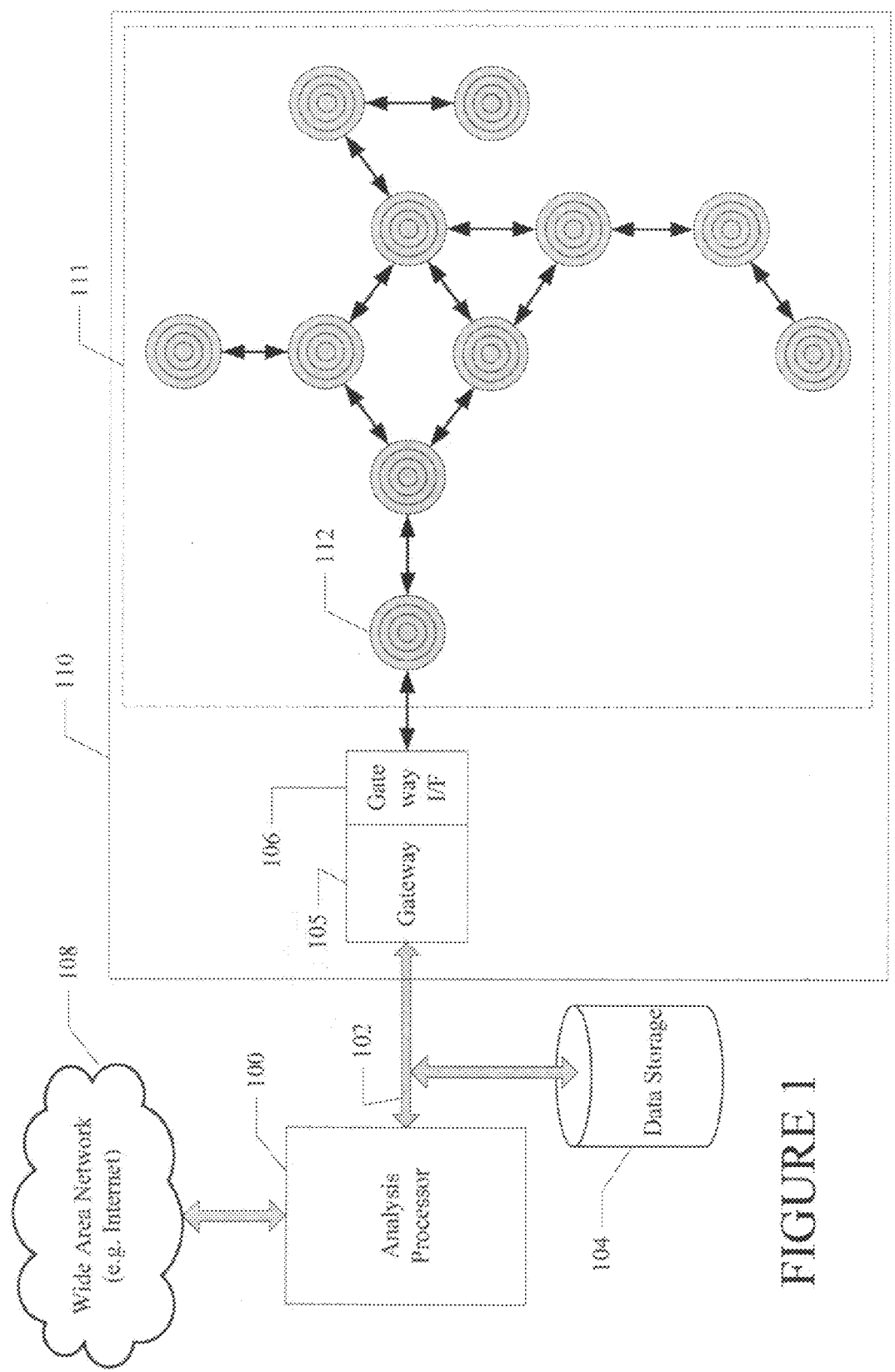
FIG. 1 illustrates a mesh network environment in which various embodiments can operate.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and a method for building integrated distributed applications for use with a mesh network. A particular embodiment relates to wireless sensor networks. Wireless sensor networks (WSN's) are emerging as an important technology that allows tight integration of the physical world with a computing system infrastructure. Ad hoc, self-organizing, distributed wireless sensor systems composed of a vast number of sensor nodes can be deeply embedded in physical environments. While nodes can vary in their basic architecture, most have severe resource limitations that call for extremely efficient computation models and communication patterns. The design and maintenance of a software infrastructure needs to be attentive to these constraints, while addressing the complexities inherent to any distributed system.

WSN's are diverse at all levels, from their hardware configurations to the applications they run. Multiple modes of sensing, computing, and communication enable a wide spectrum of applications that include, but are not limited to, disaster recovery, homeland security, civilian infrastructure monitoring, condition-based maintenance in factories, education, habitat monitoring, precision agriculture, military use, and pervasive computing environments. Applications in these areas can be characterized not only by their diversity, but also by the specific and unique requirements they impose on underlying software and network infrastructure. Often, these applications require long-term uninterrupted and unattended operations. Key characteristics that these applications must address include: 1) small embedded nodes with cost limitations and highly limited resources (e.g. small amounts of memory and low-power/low-band width communication mechanisms), 2) heterogeneity in the network nodes, 3) applications and systems software that evolve during the application lifetime, and 4) variations in physical node deployment.

In order to enable the successful development, deployment, and management of sensor network applications, the applied software technology should ideally not limit long-term reliability and secure deployment, and should ideally ensure that each of the above characteristics are suitably addressed.

A particular embodiment described herein has application to data collection from an array of sensors disposed in a network topology wherein at least two intelligent communication nodes are within reliable radio communication range within an array of peer communication nodes. The particular embodiment of an example system and method described herein presents an apparatus and method for building integrated distributed applications for use with a mesh network. The network and node configuration in to particular example embodiment are described in more detail below.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 (nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node 112 has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via as gateway interface 106. The gateway 105 provides a connection 102 between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the WSN 110 can obtain access to the Internet Gateway 105 can also provide synchronization timing for the nodes 112 of WSN 110. Gateway 105 can send periodic messages to each of the nodes 112 of WSN 110. These periodic, messages can include a timing signal (e.g. a beacon) to which each of the nodes 112 can synchronize their internal timers. Similarly, messages from gateway 105 to each of the nodes 112 can be used to provide system status, configuration, and control settings for the nodes of WSN 110. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 105 occurs only at specific times and on specific channels for local and global data communications.

The WSN 110 can be configured in any of a variety of ways. Nodes 112 can be added, removed, or moved within the array of nodes of WSN 110. Each of the nodes 112 include functionality to join or reconfigure themselves in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g. radios) within each node 112, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
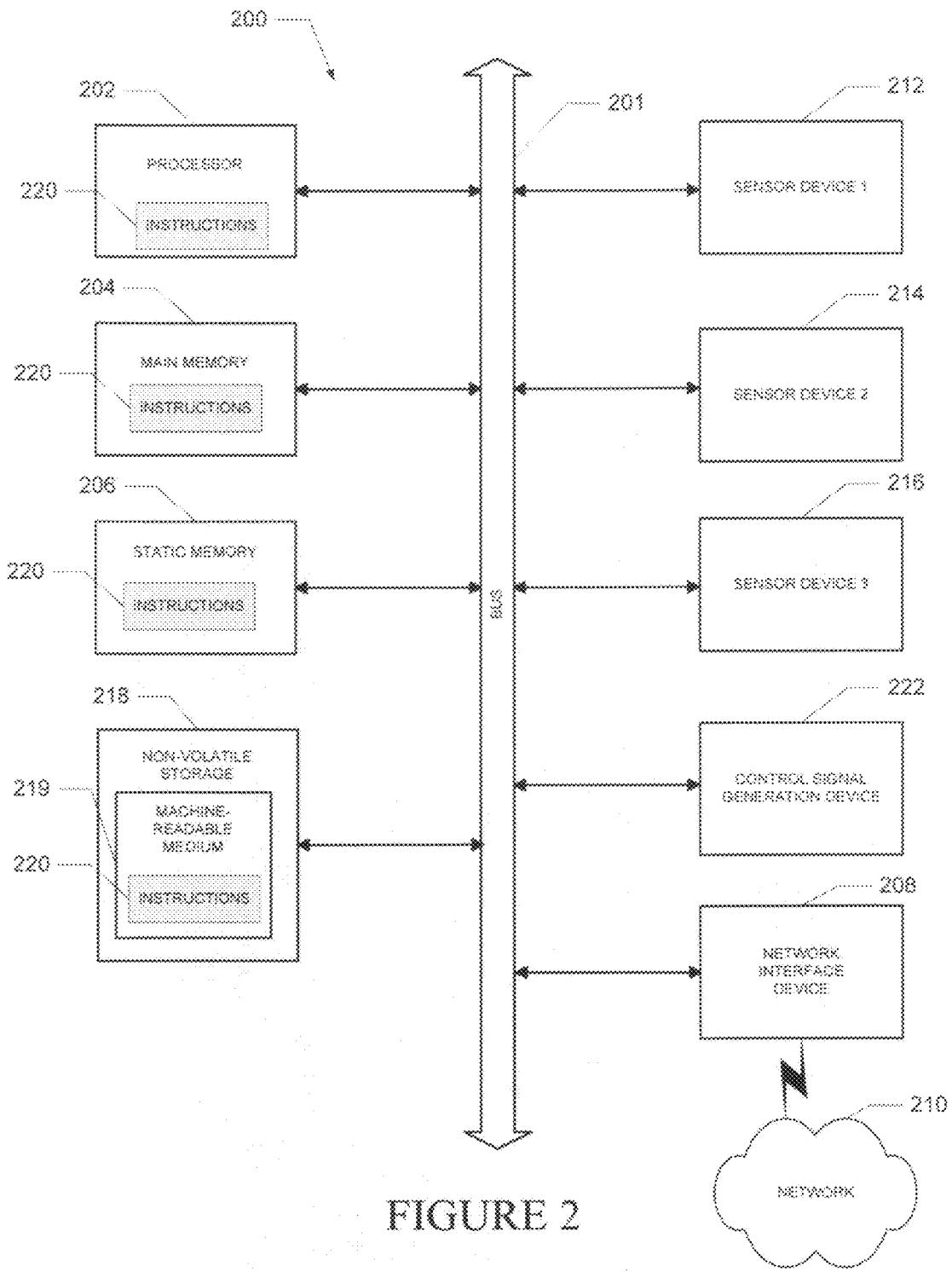
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the terms "machine", "device", or "node" shall also be taken to include any collection of machines that individually or jointly execute a set (or multiple sets) of instructions to perform any one or more of the methodologies discussed herein.

The example node 200 includes a processor 202 (e.g., a central processing unit (CPU) or a wireless sensor processing unit), a main memory 204 and optionally a static memory 206, which communicate with each other via a bus 201. The node 200 may further include one or more sensor devices 212, 214, and 216. These sensor devices can include temperature sensors, humidity sensors, air flow sensors, particle counters, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, tooling or machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g. a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver or transceiver unit for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Figure 3:
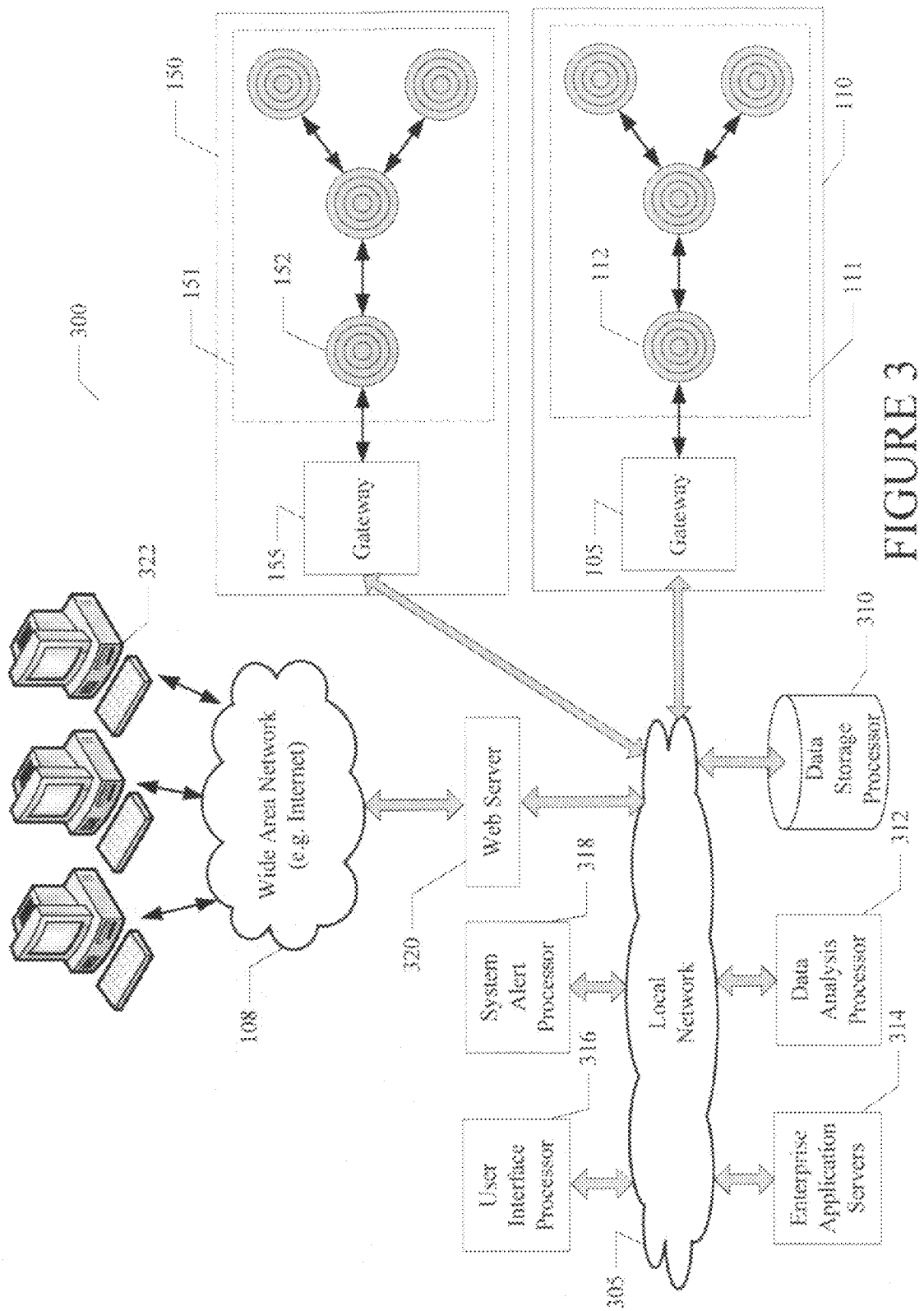
FIG. 3 illustrates an example wireless sensor network system in a particular embodiment.

FIG. 3 illustrates an example wireless sensor network system, in which a plurality of sets of heterogeneous sensor nodes 112 and 152 observe and gather information from two or more physical environments monitored by WSN 110 and WSN 150, Gateways 105 and 155 in each environment collect and aggregate these results and then send the results through a local network 305 to a data storage processor 310 that stores the data. The data analysis processor 312 in turn processes the data and can forward the results through the Internet 108 via web server 320 to a set of interested clients 322. The enterprise application servers 314 can also process the data for a plurality of enterprise applications that use the data for particular enterprise monitoring and control services. User interface processor 316 and system alert processor 318 can also process the sensor data and perform various user and system functions related to visualization and alert monitoring. Note that even a single WSN deployment may require a wide name of devices and architectures. For instance, for the WSN 110 and 150 of FIG. 3, there are several types of nodes and processors (sensor nodes, gateways, data analysis processors, enterprise application servers, user interface processors, system alert processors, and web servers), whose roles are filled by specialized devices with different hardware and software capabilities and requirements. Each of these devices may require a specialized software build to support the overall WSN application.

Figure 4:
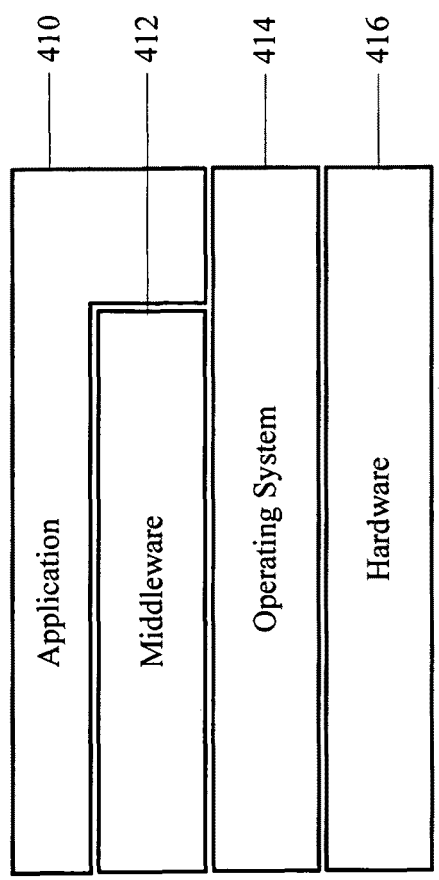
FIG. 4 illustrates the structure of a traditional software stack.

WSN applications are typically built using a software infrastructure (e.g. operating systems, middleware, virtual machines, etc.) that interface the applications with the low-level devices, provide communication mechanisms for cooperation among devices, and manage device and network-wide resources. FIG. 4 illustrates the structure of a traditional software stack. A layer of operating system software 414 is implemented directly upon the device hardware 416, and a set of middleware services 412 are built on top of the operating system software 414. Applications 410 can interact with the middleware 412 or directly with the operating system software 414 to perform a particular application function or to provide a service.

WSN software infrastructure needs to be configurable to run on a wide variety of devices, have a minimal resource footprint, and be easily adapted to run on a new set of devices. One option is to build for the lowest common denominator, but this fails to take advantage of the unique features of each platform. Maintaining a separate version of an application for each platform takes advantage of unique platform features, but requires developers to understand the peculiarities of each platform. In addition, in such an environment, it is difficult for developers who need to be able to work with software that they did not write and to account for performance and resource usage implications.

In a particular embodiment, a WSN application may consist of several software components. These software components relate to the various types of nodes and processors (e.g. sensor nodes, gateways, data analysis processors, enterprise application servers, user interface processors, system alert processors, and web servers) provided in the WSN network system. For example, referring again to FIG. 3, the components 112 and 152 of system 300 require a software stack that runs on embedded devices and that performs sensing and control in the real world. This software stack includes a system software environment (such as an operating system and/or a virtual machine), a wireless networking stack, and related applications. These software components are denoted embedded components.

Component 310 of system 300 requires a software stack that can store sensor data and support the searching and serving of this data to other system components. Component 312 of system 300 requires a software stack that can obtain sensor data either directly or from storage, analyze and mine the data, and provide processed results to other system components. Component 314 of system 300 requires a software stack that can integrate the WSN system 300 with other enterprise systems via enterprise application integration (EAI) software. EAI software acts as a hub that translates data and messages between different applications. Component 316 of system 300 requires a software stack that can produce visualizations of the sensor data and related analyzed data. Component 318 of system 300 requires a software stack that can monitor system conditions and alert system operators of significant changes in the system state. Other system components (such as process control software) can run on laptops, desktops, servers and enterprise application systems. The software components that are not embedded components are denoted as integration service components.

The system 300 also includes protocols (such as the protocols and interfaces used with local network 305, web server 320, and wide area network 108) that facilitate communication among embedded and service components. These protocols can also include conventional wired or wireless communication protocols, authentication protocols, encryption protocols, and the like.

A WSN application in a particular embodiment, therefore, spans both traditional computing systems and abstractions, and networked embedded devices. The various embodiments described herein address several key questions in building a WSN application. First, it is important to define the various components that comprise the WSN application. Secondly, it is important to specify how these components are assembled together to build a complete WSN system solution. These WSN application component definition and assembly operations are described in more detail below.

Various embodiments provide a set of component-based development techniques that automate the process of customizing applications and system software for a range of widely different platforms, thereby making WSN applications easier to write, deploy, and maintain. This approach addresses the problems with conventional techniques by defining an integrated approach to application development of both embedded and service components of the WSN application.

In a particular example embodiment, there are two components of the software architecture: one component is the data model that is shared between the embedded and service components. We call this view the shared data view. The shared data view captures the state that will be collected and processed at the embedded devices and will then be manipulated and/or viewed by the service components in different ways. In a particular embodiment, the shared data view includes a description of runtime state that will be evaluated at the components of the network. The shared data view becomes the basis for automated generation of a data schema on devices and on service components, and for generation of communication and integration code. The shared data view enables a visualization system to provide a visualization description of the runtime state that is evaluated at the components of the network. The shared data view also enables generation of an alert system to provide management of events, alerts, and responses related to the runtime state at the component. The shared data view can be defined using a C, C++, Java or C# structure or class abstraction in a particular embodiment. It will be apparent to those of ordinary skill in the art that other programming languages, scripting languages, mark-up languages, or logic descriptors may similarly be used.

The second component of the software architecture of a particular embodiment is the operational view of the application, which allows interoperation among different components. We call this view the shared service view. The shared service view defines the set of services the embedded components can export or otherwise provide to other components of the network. Embedded application and service components use the shared service view to interact and communicate with each other. In a particular embodiment, the description of services provided in a shared service view is defined in terms of method signatures. The shared service view can be defined using C++, Java or C# class/component specification mechanisms in a particular embodiment. It will be apparent to those of ordinary skill in the art that other programming languages, scripting languages, mark-up languages, or logic descriptors may similarly be used.

Additionally, an application developer may optionally extend the default shared data view and shared service view (collectively called the shared views or the common view) to customize the default behavior of the WSN system. For example, referring to FIG. 5, the figure illustrates four extensions of the shared views in an example embodiment. These example views include the device view 518, data view 516, Graphical User Interface (GUI)/alert view 514, and web services view 512. The device view 518 extends the common view to extend or override the default behavior on the embedded devices. The data view 516 specifies how WSN data will be stored in the long term data storage device 311. The GUI/alert view 514 extends the shared view to customize the visualization characteristics for a particular WSN system. The GUI/alert view 514 enables generation of a visualization system to provide a visualization description of the services provided by the plurality of components of the network. GUI/alert view 514 also enables generation of an alert system to provide management of events, alerts, and responses related to the services provided by the plurality of components of the network. Similarly, the web services view 512 extends the common view to customize the enterprise integration characteristics for a particular WSN system. The web services view 512 enables the generation of a web services system that provides web-specific inter-operability between network components that provide the services and network components that use the services. Further, the shared service view enables generation of an integration system that provides process control software-specific inter-operability between network components that provide services and components that use the services. A WSN application is thus defined in terms of a shared data view, a shared service view, and extended views. The shared data view, shared service view, and extended views serve as a high level specification of how the WSN application captures and collects data at the embedded devices 105 and 112 of network 110, and how the collected data is processed and manipulated by the service components 310, 312, 314, 316, and 318. The generation and use of this high level specification in a particular embodiment is described in more detail below.

The following shows an example of a shared data view, written in annotated Java for a particular embodiment:

```
@shared_data_view class TempRHSchema {
    @unsigned public                                    short rhVal;
    @unsigned public                                    short tempVal;
    @unsigned public @include_system_metadata           time globalTime;
    @unsigned public @include_logical_id_metadata short nodeId;
}
```

In this example, TempRHSchema represents a shared data view or a data model shared among embedded devices and service components. The shared data view of the example definition includes the following variables: rhVal and tempVal, which respectively denote the relative humidity and temperature data collected by the sensors at the embedded devices. Variable globalTime denotes the time at which data was sampled, whereas nodeId captures the logical identifier of the device. The definition includes annotations (prefixed in this example with an '@' symbol) used to associate specific semantics with the data entities. These annotations can be used by compilers to generate components of the software stack for the end devices and the integration services. Example annotation @shared_data_view is a keyword used to indicate that TempRHSchema is a data structure used to share information among different distributed components. Compilers can use this definition to automatically generate database schemas and queries, code for serialization and deserialization, graphical user interface (GUI) schemas, alert schemas, and high level application programming interfaces (API's). Annotations @include_system_metadata indicates that the variable is a data structure maintained system wide by the runtime system. For instance, in the above example definition, globalTime is represented by system metadata indicating a common global time maintained internally by the underlying runtime system. When the node collects temperature and humidity data, the current global time is read from the system and stored as part of the data structure. Similarly, the annotation @include_logical_id_metadata_represents the logical identifier metadata associated with each device, and is associated with variable nodeId.

An extended data view adds or modifies the attributes to a shared data view. The example below shows an extended alert data view that will enable the alert system to trigger errors and exception conditions.

```
@extended_alert_data_view AlertTempRHSchema extends
TempRHSchema {
    @alert_lower_threshold          short tempVal_low;
    @alert_upper_threshold          short tempVal_up;
    @alert_message                  char[ ] message;
    @alert_email      char[ ] mail_address;
}
```

In the above example extended data view definition, AlertTempRHSchema extends TempRHSchema to include three additional variables: tempVal_low, tempVal_up, message and mail_address. The additional variables can be used to check for boundary conditions and trigger a message to a pre-defined mail_address. The compiler can use the above example extended data view definition to automatically generate code for: (i) setting up lower and upper bounds on temperature values, (ii) setting up messages and mail addresses, (iii) checking for upper and lower bounds on the incoming packets, and (iv) sending messages, if exception conditions are reached. Similar extended views can be defined for other integration services.

The shared service view or common service model defines an interface into the services provided by devices and applications in the network of a particular embodiment. Each device can export a set of services through a standard set of interfaces. The interfaces become the basis for each software component to interact with other software components. A common service model can be used to model hardware components (such as a micro-controller unit, flash, or light-emitting diodes (LED's), sensors and application services. The example definitions below show examples of each:

```
@device_component interface Led {
    enum color (red, yellow, green);
    @export_svc public void ledOn(Led.color val);
    @export_svc public void ledOff(Led.color val);
    @export_svc public void ledToggle(Led.colol val);
}
```

The above example shared service view definition specifies a service, called Led, which represents a hardware component of a device (as identified by the tag or annotation @device_component). The example shared service view definition exports three services: ledOn, ledOff, and ledToggle that any hardware LED component supports. An application service can run on specific devices and can provide a set of services. Below, an example of an application service is shown:

```
@application_service class CollectTempRHSVC extends TempRHData {
    // The following data parameters can be modified through
    // a get/set exported methods
    @export_params public byte sensingFreq; // how often sense?
    @export_params public byte sendFreq; // how often send?
    // Services: used by other components
    @export_svc public native void start( );
    @export_svc public native void stop( );
    @export_svc public native float getTemp( );
    @export_svc public native float getAvgTempValue(byte count);
}
```

In the above example of an application service definition, CollectTempRHSVC defines an application service. CollectTempRHSVC exports services (such as start, stop, getTemp, and getAvgTempValue) that can be used by other software components. For instance, an invocation of a service getTemp returns the current temperature as sensed by the end user or other device.

A distributed program is, thus, defined by a set of shared data views, extended data views; and shared service definitions that specify and enable a compiler to automatically generate the program executed at each device.

In a particular embodiment, a WSN application generation system receives as input a specific shared data view, shared service view, and extended view. In conformity with these views, the WSN application generation system can generate an entire WSN application system. In a particular embodiment and referring to the example embodiments shown in FIGS. 5 and 6, the operation of the WSN application generation system includes the operations described below.

In one embodiment, a device compiler 528 reads the shared view 510 and the device view 518, and builds a customized software environment for different systems of the embedded devices of network 110. Device compiler 528 uses the shared view 510 and the device view 518 to configure the system software stack that is needed to run on different devices of the embedded devices of network 110.

The compiler can use the shared and extended data views, and service views to generate different software stacks for system devices. Referring again to the specific example shared data view described above, the compiler can use the example shared data view, TempRHSchema, to automatically generate a relational table as follows:

```
CREATE TABLE `TBL_TempRHSchema` (
    devId smallinit(10),
    globalTime time,
    `tempVal` smallint(10),
    `rhVal` smallint(10)
)
```

In addition, the compiler can also automatically generate queries to store, retrieve, and delete specific tuples from the 'TBL_TempRHSchema' defined in the example above.

Figure 6:
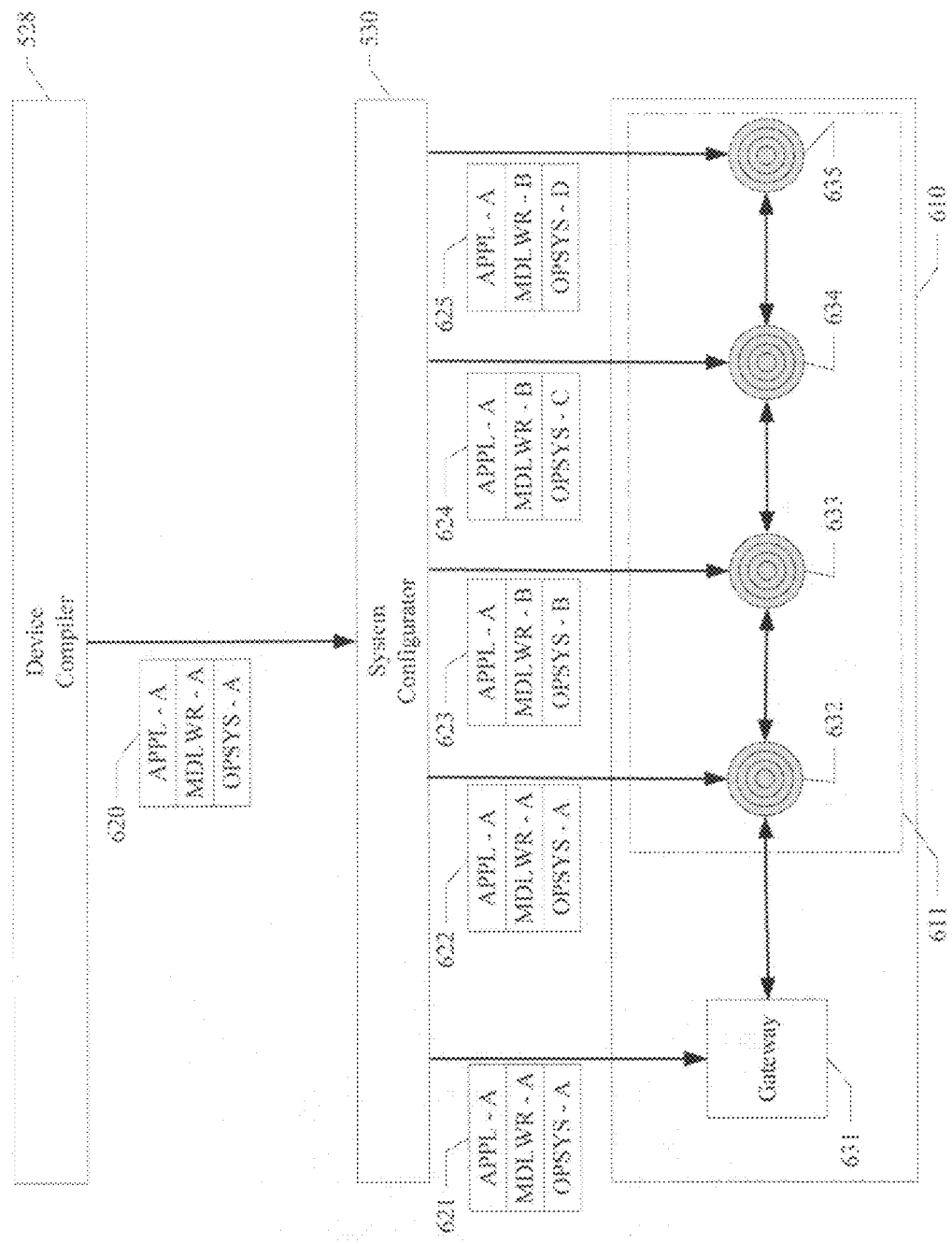
FIG. 6 illustrates how the device compiler and system configurator of a particular embodiment generate a customized software stack for each device of the embedded devices of a network.

As shown in the example of FIG. 6 and described above device compiler 528 can generate a customized software stack 620, which is customized thr each device of the embedded devices of network 110 by system configurator 530. As shown in FIG. 6, system configurator 530 can use the device software stack 620 generated by device compiler 528 to generate a customized software stack 621 for gateway device 631 of sensor network 610. The customized software stack 621 includes an application layer (APPL-A), a middleware layer (MDLWR-A), and an operating system layer (OPSYS-A). In the example shown in FIG. 6, each of the layers of software stack 621 can be configured with a specific set of software components (designated set A) that provide the data and service elements specified for gateway device 631 by the device view 518 and the shared view 510.

In a similar manner, system configurator 530 can use the device software stack 620 generated by device compiler 528 to generate a customized software stack 622 for sensor device 632 of sensor network 611. The customized software stack 622 includes an application layer (APPL-A), a middleware layer (MDLWR-A), and an operating system layer (OPSYS-A). In the example shown in FIG. 6, each of the layers of software stack 622 can be configured with a specific set of software components (designated set A) that provide the data and service elements specified for sensor device 632 by the device view 518 and the shared view 510.

The system configurator 530 can also use the device software stack 620 generated by device compiler 528 to generate a customized software stack 623 for sensor device 633 of sensor network 611. The customized software stack 623 includes an application layer (APPL-A), a middleware layer (MDLWR-B), and an operating system layer (OPSYS-B). In the example shown in FIG. 6, each of the layers of software stack 623 can be configured with a specific set of software components that provide the data and service elements specified for sensor device 633 by the device view 518 and the shared view 510. In this case, software stack 623 includes the same application layer (APPL-A) as software stacks 621 and 622. However, the middleware layer and operating system layer of software stack 623 are different (designated set B) from the corresponding layers of software stacks 621 and 622. This difference in the customized software stack produced for sensor 633 by system configurator 530 corresponds to the differences in the capabilities and responsibilities associated with sensor 633 as specified in the device view 518 and shared view 510.

The system configurator 530 can also use the device software stack 620 generated by device compiler 528 to generate a customized software stack 624 for sensor device 634 of sensor network 611. The customized software stack 624 includes an application layer (APPL-A), a middleware layer (MDLWR-B), and an operating system layer (OPSYS-C). In the example shown in FIG. 6, each of the layers of software stack 624 can be configured with a specific set of software components that provide the data and service elements specified for sensor device 634 by the device view 518 and the shared view 510. In this case, software stack 624 includes the same application layer (APPL-A) as software stacks 621, 622, and 623 and the same middleware layer (MDLWR-B) as software stack 623. However, the middleware layer and operating system layer of software stack 624 are different from the corresponding layers of software stacks 621 and 622. Further, the operating system layer (OPSYS-C) of software stack 624 is different from the corresponding layer of software stack 623. This difference in the customized software stack produced for sensor 634 by system configurator 530 corresponds to the differences in the capabilities and responsibilities associated with sensor 634 as specified in the device view 518 and shared view 510.

In a similar manner, system configurator 530 can build customized software stacks for each of the devices of embedded network 610. These software stacks can include a unique set of software layers or the stacks may include layers in common with other device software stacks as shown in the example of FIG. 6.

Once the customized software stacks are generated as described above, the customized software stacks can then be distributed to each of the corresponding nodes of network 110. The device compiler 528 can also generate the code for serializing and de-serializing the data on the devices of network 110.

Figure 5:
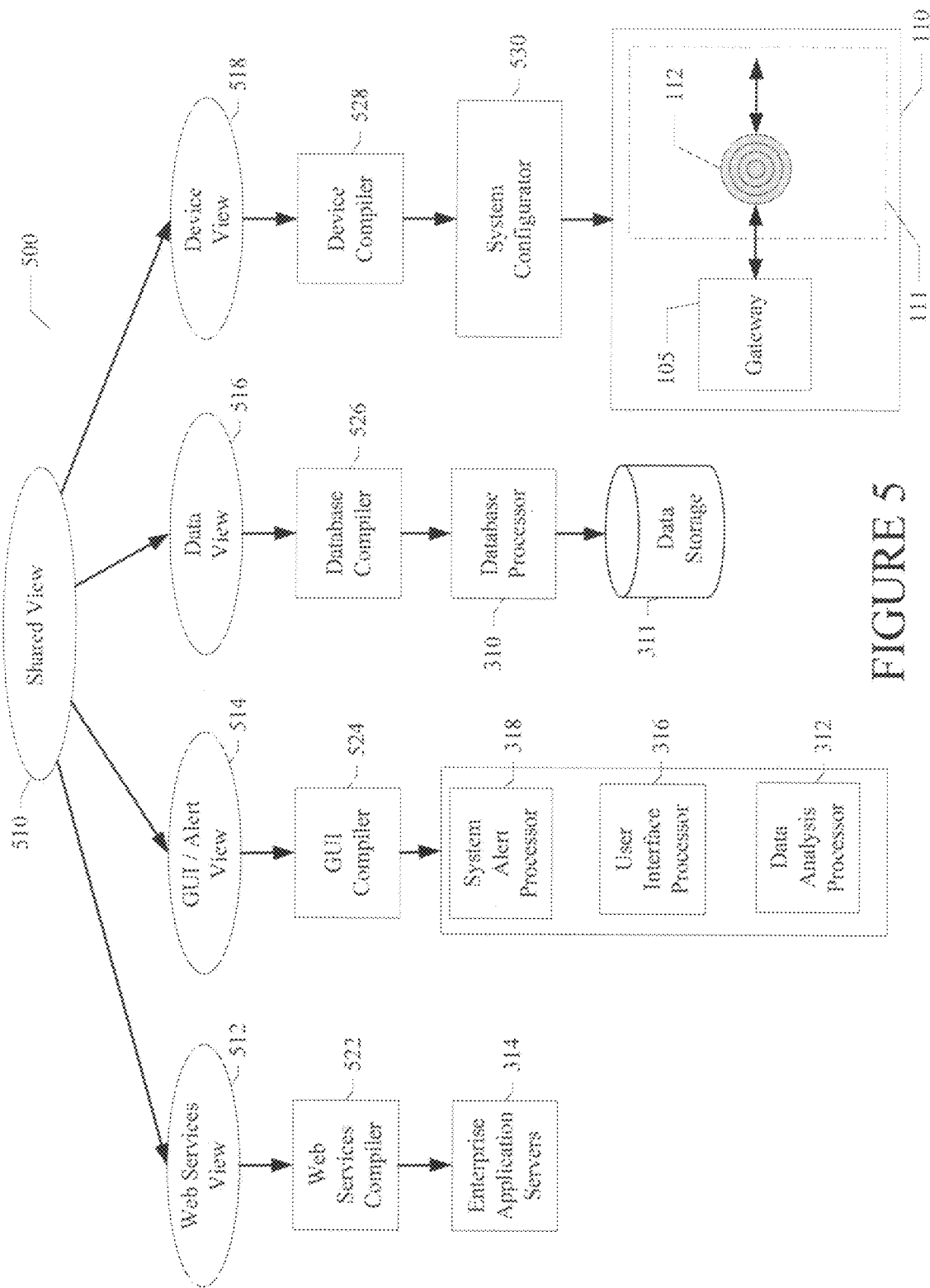
FIG. 5 illustrates four sample extensions of the shared views in an example embodiment.

In another operation of a particular embodiment, a database compiler 526, as shown in FIG. 5, reads the shared view 510 and the data view 516, and generates a schema and database queries for storing, modifying, and accessing data entries produced by the embedded devices of network 110. The schema and database queries can be used by the database processor 310 to provide system access to the data stored in data storage device 311.

In another operation of a particular embodiment, a GUI compiler 524, as shown in FIG. 5, reads the shared view 510 and the GUI/alert view 514, and generates a visualization schema and an alert system from the GUI/alert view 514.

In yet another operation of a particular embodiment, a web services compiler 522, as shown in FIG. 5, reads the shared view 510 and the web services view 512, and generates a web services proxy, which translates web services protocol into a protocol compatible with the WSN system.

The approach as described in various embodiments herein has several advantages. Firstly, the WSN application generation system of various embodiments is platform independent. Secondly, the system provides a high level programming model. This model enables the system to automatically generate much of the system software code and plumbing or interoperability code, which eliminates data inconsistency and coding errors between embedded and service components. The approach also eliminates code duplication and reduces manual coding and integration efforts.

Figure 7:
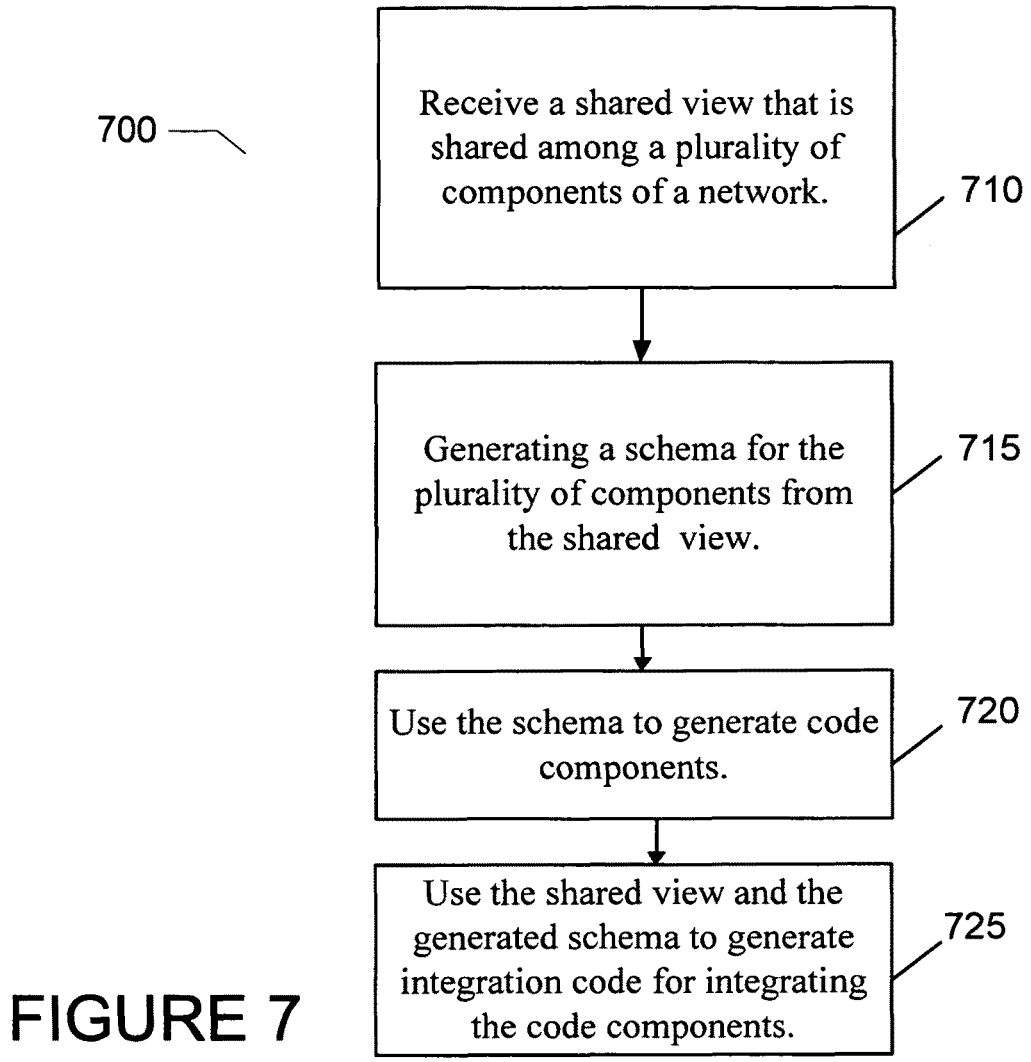
FIG. 7 is a flow diagram illustrating the processing flow for a particular example embodiment.

FIG. 7 is a flow diagram illustrating the basic processing flow 700 for a particular embodiment. As shown, an example embodiment is configured to receive a shared view that is shared among a plurality of components of a network (processing block 710); generate a schema for the plurality of components from the shared view (processing block 715); use the schema to generate code components (processing block 720); and use the shared view and the generated schema to generate integration code for integrating the code components (processing block 725).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single non-transitory computer readable storage medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described above, an apparatus and method for building integrated distributed applications for use with a mesh network is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A method comprising:
receiving a shared view that is shared among a plurality of components of a network, the shared view being a data model that includes a shared service view, the shared service view being as description of the services provided by each of the plurality of components of the network, wherein the description of services is defined in terms of method signatures, the method signatures being class and component specification mechanisms of a particular programming language, the shared view further including a shared state view, the shared state view being a description of runtime state evaluated at the plurality of components of the network;
generating a schema for the plurality of components from the shared view, shared view providing a basis for automatic generation of the schema for the plurality of components of the network;
using the schema to generate code components the plurality of components of the network; and
using the shared view and the generated schema to generate integration code for integrating the code components.

2. The method of claim 1, wherein the method signatures may in Java or C++.

3. The method of claim 1, wherein the shared service view enables generation of a visualization system to provide a visualization description of the services provided by the plurality of components of the network.

4. The method of claim 1, wherein the shared service view enables generation of an alert system to provide management of events, alerts and responses related to the services provided by the plurality of components of the network.

5. The method of claim 1, wherein the shared service view enables generation of as web services system that provides web-specific inter-operability between network components that provide the services and network components that use the services.

6. The method of claim 1, wherein the shared service view enables generation of an integration system that provides process control software-specific inter-operability between network components that provide services and components that use the services.

7. The method of claim 1, wherein the description of runtime state is evaluated using Java or C++ classes.

8. The method of claim 1, wherein the shared state view enables a visualization system to provide a visualization description of the runtime state that is evaluated at the components of the network.

9. The method of claim 1, wherein the shared state view enables generation of an alert system to provide management of events, alerts, and responses related to the runtime state at the component.

10. The method of claim 1 wherein generating the code components includes generating code for all the code computations that must be performed at the corresponding component.

11. The method of claim 1, wherein the plurality of components of the network include at least one from the group: a device-side software component; a database component; a web-services component; a visualization component; and a process control component.

12. The method of claim 11, wherein the device-side software component includes a wireless sensor processing unit, a transmitting unit, and a receiving unit.

13. The method of claim 1, wherein the network is a wireless sensor network.

14. A non-transitory computer-readable storage medium for storing instructions that when executed by a computer causes the computer to:
receive a shared view that is shared among a plurality of components of a network, the shared view being a data model that includes a shared service view, the shared service view being a description of the services provided, by each of the plurality of components of the network, wherein the description of services is defined in terms of method signatures, the method signatures being class and components specification mechanisms of a particular programming language, the shared view further including a shared state view, the shared state view being a description of runtime state evaluated at the plurality of components of the network;
generate a schema for the plurality of components from the shared view, shared view providing a basis for automatic generation of the schema for the plurality of components of the network;
use the schema to generate code components for the plurality of components of the network; and
use the shared view and the generated schema to generate integration code for integrating the code components.

15. The computer-readable storage medium of claim 14, wherein the method signatures may in Java or C++.

16. The computer-readable storage medium of claim 14, wherein the shared service view enables generation of a visualization system to provide a visualization description of the services provided by the plurality of components of the network.

17. The computer-readable storage medium of claim 14, wherein the shared service view enables generation of an alert system to provide management of events, alerts, and responses related to the services provided by the plurality of components of the network.

18. The computer-readable storage medium of claim 14, wherein the shared service view enables generation of a web services system that provides web-specific inter-operability between network components that provide the services and network components that use the services.

19. The computer-readable storage medium of claim 14, wherein the shared service view enables generation of an integration system that provides process control software-specific inter-operability between network components that provide services and components that use the services.

20. The computer-readable storage medium of claim 14, wherein the description of runtime state is evaluated using Java or C++ classes.

21. The computer-readable storage medium of claim 14, wherein the shared state view enables a visualization system to provide a visualization description of the runtime state that is evaluated at the components of the network.

22. The computer-readable storage medium of claim 14, wherein the shared state view enables generation of an alert system to provide management of events, alerts, and responses related to the runtime state at the components.

23. The computer-readable storage medium of claim 14, wherein generating the code components includes generating code for all the code computations that must be performed at the corresponding component.

24. The computer-readable storage medium of claim 14, wherein the plurality of components of the network include at least one from the group; a device-side software component; a database component; a web-services component; a visualization component; and a process control component.

25. The computer-readable storage medium of claim 24, wherein the device-side software component includes a wireless sensor processing unit, a transmitting unit, and a receiving unit.

26. The computer-readable storage medium of claim 14, wherein the network is a wireless sensor network.

27. An apparatus comprising:
a data processor;
a receiving mechanism, for execution by the data processor, configured to receive a shared view that is shared among a plurality of components of a network, the shared view being a data model that includes a shared service view, the shared service view being a description of the services provided by each of the plurality of components of the network, wherein the description of services is defined in terms of method signatures, the method signatures being class and component specification mechanisms of a particular programming language, the shared view further including a shared state view, the shared state view being a description of runtime state evaluated at the plurality of components of the network; and a generating mechanism, for execution by the data processor, configured to generate a schema for each of the plurality of components from the shared view, shared view providing a basis for automatic generation of the schema for the plurality of components of the network, the generating mechanism further configured to use the schema to generate code components for the plurality of components of the network, and to use the shared view and the generated schema to generate integration code for integrating the code components.

28. The apparatus of claim 27, wherein the method signatures may in Java or C++.

29. The apparatus of claim 27, wherein the shared service view enables generation of a visualization system to provide a visualization description of the services provided by the plurality of components of the network.

30. The apparatus of claim 27, wherein the shared service view enables generation of an alert system to provide management of events, alerts, and responses related to the services provided by the plurality of components of the network.

31. The apparatus of claim 27, wherein the shared service view enables generation of a web services system that provides web-specific inter-operability between network components that provide the services and network components that use the services.

32. The apparatus of claim 27, wherein the shared service view enables generation of an integration system that provides process control software-specific inter-operability between network components that provide services and components that use the services.

33. The apparatus of claim 27, wherein the description of runtime state is evaluated using Java or C++ classes.

34. The apparatus of claim 27, wherein the shared state view enables a visualization system to provide a visualization description of the runtime state that is evaluated at the components of the network.

35. The apparatus of claim 27, wherein the shared state view enables generation of an alert system to provide management of events, alerts, and responses related to the runtime state at the components.

36. The apparatus of claim 27, wherein generating the code components includes generating code for all the code computations that must be performed at the corresponding component.

37. The apparatus of claim 27, wherein the plurality of components of the network include at least one from the group: a device-side software component; as database component; a web-services component; a visualization component; and a process control component.

38. The apparatus of claim 37, wherein the device-side software component includes a wireless sensor processing unit, a transmitting unit, and a receiving unit.

39. The apparatus of claim 27, wherein the network is as wireless sensor network.

* * * * *